US012807862B2

(12) United States Patent
Wang et al.

(10) Patent No.: US 12,807,862 B2
(45) Date of Patent: Nov. 24, 2026

(54) SCALE INHIBITOR SQUEEZE TREATMENT

(71) Applicants: Saudi Arabian Oil Company, Dhahran (SA); Halliburton Energy Services, Inc., Houston, TX (US)

(72) Inventors: Qiwei Wang, Dhahran (SA); Tao Chen, Dhahran (SA); Zhiwei Yue, Sugar Land, TX (US); Tawfik Al-Ghamdi, Dammam (SA)

(73) Assignees: Saudi Arabian Oil Company, Dhahran (SA); Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/982,827

(22) Filed: Dec. 16, 2024

(65) Prior Publication Data

US 2025/0115803 A1 Apr. 10, 2025

Related U.S. Application Data

(62) Division of application No. 18/240,161, filed on Aug. 30, 2023, now abandoned.

(51) Int. Cl.
*C09K 8/528* (2006.01)
*C09K 8/536* (2006.01)

(52) U.S. Cl.
CPC .............. *C09K 8/528* (2013.01); *C09K 8/536* (2013.01)

(58) Field of Classification Search
CPC .......... C09K 8/528; C09K 8/536; C09K 8/52; C09K 8/54; E21B 37/00; E21B 37/06; C02F 5/00; C02F 5/04; C02F 5/06; C02F 5/08; C02F 5/10; C02F 5/12; C02F 5/14; C02F 2303/22
See application file for complete search history.

(56) References Cited

U.S. PATENT DOCUMENTS

2020/0157417 A1* 5/2020 Bhaduri .................. E21B 43/04
2022/0120159 A1* 4/2022 Chen ...................... C09K 8/584
2023/0366296 A1* 11/2023 Mayor ..................... C09K 8/74
2023/0383171 A1* 11/2023 Shen ...................... C09K 8/528
2025/0026975 A1* 1/2025 Lu .......................... C09K 8/528

FOREIGN PATENT DOCUMENTS

CN 103787518 A * 5/2014
CN 104371684 A * 2/2015 ............ C09K 8/524
CN 105645611 A * 6/2016 ............ C23F 11/181
CN 106430648 A * 2/2017 ................ C02F 5/10
WO WO-2024026137 A1 * 2/2024 ............... C09K 8/52

OTHER PUBLICATIONS

English translation of CN 103787518 A (Year: 2014).*
English translation of CN-104371684-A (Year: 2015).*
English translation of CN-105645611-A (Year: 2016).*
English translation of CN-106430648-A (Year: 2017).*

* cited by examiner

*Primary Examiner* — Angela M DiTrani Leff
(74) *Attorney, Agent, or Firm* — Fish & Richardson P.C.

(57) ABSTRACT

A system and a method for implementing a squeeze treatment to apply a scale inhibitor in a wellbore are provided. An exemplary method includes mixing a scale inhibitor pill. The scale inhibitor pill includes polyamino polyether methylene phosphonic acid (PAPEMP) and amino trimethylene phosphonic acid (ATMP). Pre-flush chemicals are injected into the wellbore. The scale inhibitor pill is injected into the wellbore. An over flush is injected into the wellbore. The wellbore is shut in for a target period of time and normal production is resumed.

11 Claims, 10 Drawing Sheets

SCALE INHIBITOR SQUEEZE TREATMENT

CROSS-REFERENCE TO RELATED APPLICATIONS

This application is a divisional and claims the benefit of priority of U.S. patent application Ser. No. 18/240,161, filed Aug. 30, 2023, the entire contents of which are incorporated by reference in its entirety.

TECHNICAL FIELD

This disclosure relates to methods and systems for improving scale inhibitor with blends of phosphonic acids.

BACKGROUND

Formation of inorganic mineral scale is a common issue in oilfields. Suspended scale solids may plug formations and cause other problems. Adherent scale deposits can restrict flow in pipes and damage equipment such as pumps. Corrosion and microbiological activity are often accelerated under scale deposits. Because water-formed scales are responsible for many production problems, scale control is a primary objective of any efficient water handling operations.

Squeeze treatments are a common way to apply scale inhibitor downhole in a wellbore. The produced water entering the treated zone near the wellbore picks up the chemical, either by desorption or by dissolving a portion of the inhibitor precipitate. As long as enough inhibitor enters the produced water, no scale should form in the formation, perforations, downhole equipment, or tubing. The entire well is protected.

SUMMARY

An embodiment disclosed herein provides a scale inhibitor composition. The scale inhibitor composition includes polyamino polyether methylene phosphonic acid (PAPEMP) and amino trimethylene phosphonic acid (ATMP).

Another embodiment disclosed here provides a method for implementing a squeeze treatment to apply a scale inhibitor in a wellbore. The method includes mixing a scale inhibitor pill. The scale inhibitor pill includes polyamino polyether methylene phosphonic acid (PAPEMP) and amino trimethylene phosphonic acid (ATMP). Pre-flush chemicals are injected into the wellbore. The scale inhibitor pill is injected into the wellbore. An over flush is injected into the wellbore. The wellbore is shut in for a target period of time and normal production is resumed.

DETAILED DESCRIPTION

Embodiments described herein provide a scale inhibitor squeeze (SIS) system and method in which a new type of additive, polyamino polyether methylene phosphonic acid (PAPEMP), is used to extend SIS treatment life by elevating the return concentration of the scale inhibitor amino trimethylene phosphonic acid (ATMP) from carbonate reservoirs above the minimum effective concentration (MEC), for an extended period. As used herein, the MEC is the minimum inhibitor concentration to prevent scale formation.

As discussed in examples, packed column tests showed that with about 2% PAPEMP added in the ATMP inhibitor pill, the SIS life can be significantly extended, for example, an about 186% increase when MEC=3 ppm and about 108% increase when MEC=2 ppm over the treatment with ATMP alone. When 1% PAPEMP is added in the ATMP inhibitor pill, the SIS life was increased 121% increase with MEC=3 ppm and 71% with MEC=2 ppm. The enhancing additive has many advantages over previous technologies. In addition to the superior performance, it is low cost, fully compatible with the main inhibitor, and also an effective $CaCO_3$ inhibitor itself.

Figure 1:
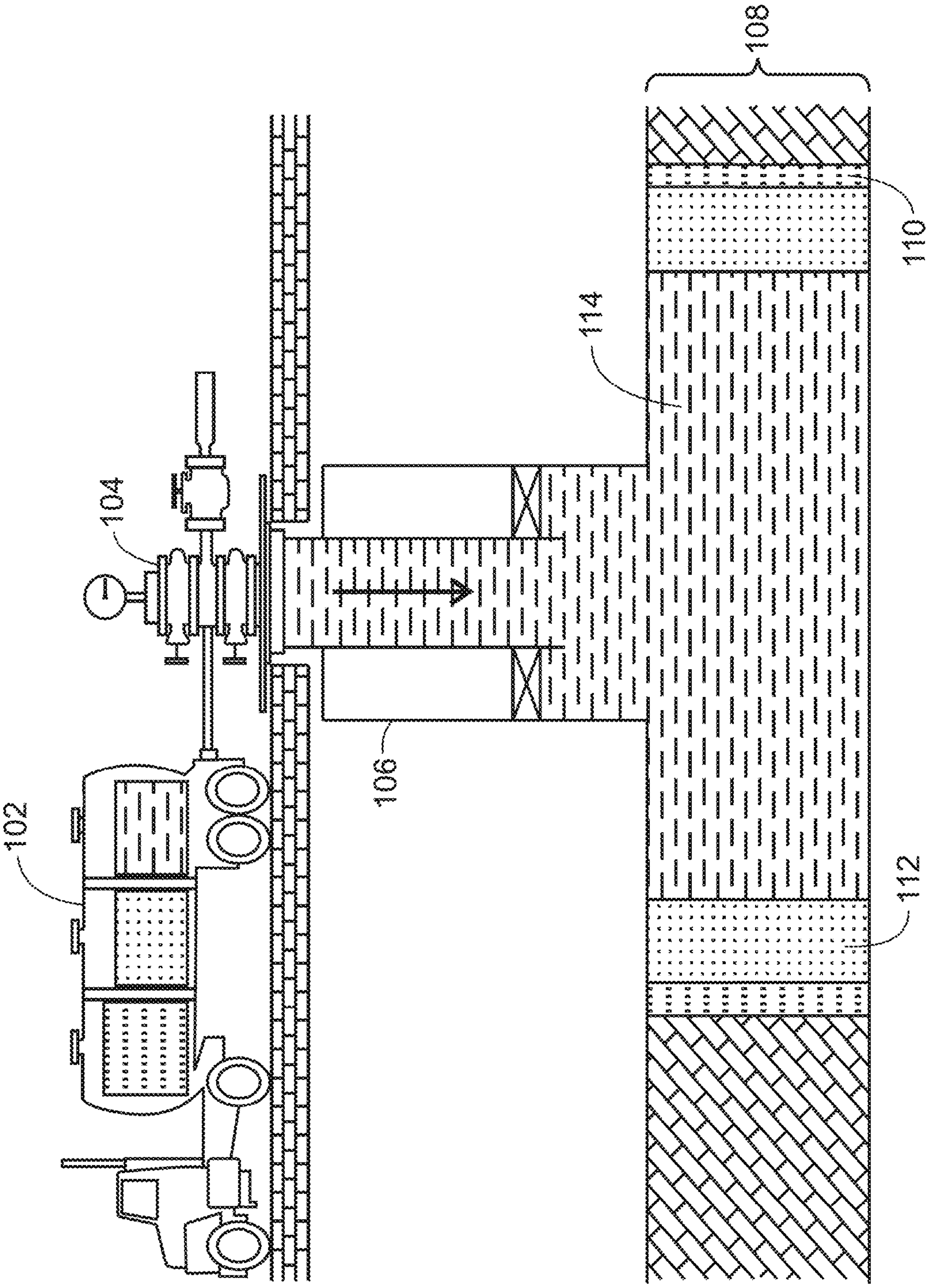
FIG. 1 is a schematic drawing of a scale inhibitor squeeze (SIS) treatment using an improved squeeze inhibitor pill.

FIG. 1 is a schematic drawing of a scale inhibitor squeeze (SIS) treatment using an improved squeeze inhibitor pill. In the SIS treatment, surface equipment 102 is used to inject a series of treating solutions through the wellhead 104 into the wellbore 106.

Squeeze treatments are a common way to apply scale inhibitor downhole. The major advantage of the squeeze technique is that the inhibitor is placed into the reservoir 108, thereby providing protection starting inside the formation. Often the wellbore 106 is treated first to remove existing scale. This is mostly performed with an acid treatment. An acid treatment fluid is injected into the wellbore 106, and the spent treatment fluid is allowed to return to the surface.

After the treatment fluid, e.g., spent acid and dissolved scale, is allowed to return, pre-flush chemicals 110 are injected. These may include, for example, mutual solvents, clay stabilizers, and the like. For example, mutual solvents, such as butyl tri-glycol ether (BTGE) and ethylene glycol monobutyl ether (EGMBE), may enhance inhibitor retention. As used herein, the mutual solvents are miscible in both water and many organic solvents. When included in the pre-flush stage, for example, at a concentration of between about 0.1 vol. % to about 20 vol. %, the mutual solvent can assist in accelerating the well clean-up process and altering the rock from oil-wet to more water-wet. Mutual solvents can also lower the surface tension to minimize water blockage, thus improving the permeability recovered after the treatment.

The scale inhibitor pill 112 is then injected. As described herein, the scale inhibitor pill 112 is a solution of a scale inhibitor in field brine, usually at several percent concentration. An overflush 114 is used to push the inhibitor several feet away from the wellbore 106, and into the reservoir 108. The overflush 114 is usually field brine. The wellbore 106 is shut in for a target period of time, such as several hours to several days, to allow the scale inhibitor to be retained in the formation by adsorbing onto the rock surfaces or by precipitating in the formation. This usually occurs as a result of excess calcium. After the target period of time is completed, normal production is resumed and the amount of scale inhibitor in the produced fluids can be monitored.

Figure 2:
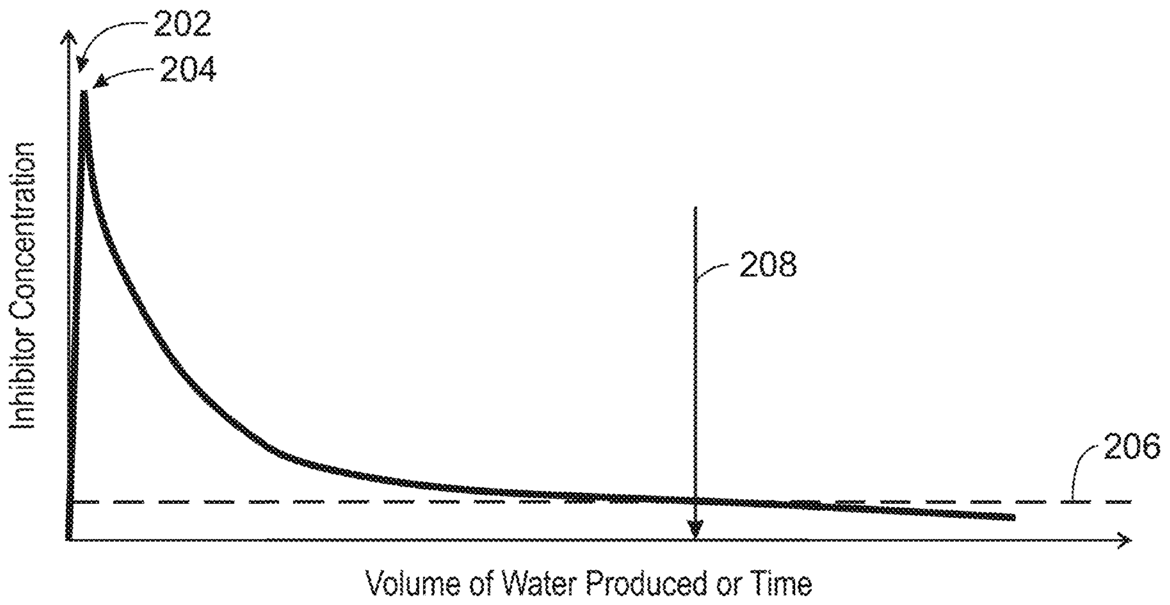
FIG. 2 is a plot of the profile of the inhibitor concentration over the total volume of water produced, which correlates to time.

FIG. 2 is a plot of the profile of the inhibitor concentration over the total volume of water produced, which correlates to time. Unfortunately, the chemical feedback concentration of the SIS treatment cannot be easily controlled. Initially, as shown at label 202, little chemical is seen as the overflush returns. After that, as shown in table 204, a high concentration of inhibitor representing the material that did not readily adsorb or precipitate is returned. Finally, there is a long, gradual depletion of the chemical, which may last over thousands of barrels and several months of production. When the inhibitor concentration finally falls below its minimum effective concentration (MEC) 206 for the produced brine, the SIS treatment must be repeated to maintain protection. The number of barrels of produced water treated or the duration of the treatment at which the inhibitor concentration falls below the MEC 206 is termed the scale inhibitor squeeze (SIS) life 208.

A SIS life 208 that is short presents a major economical and operational challenge. Various technologies and approaches have been evaluated and reported to improve the SIS life to away. These include improving the modeling methods to help the design and placement of the treatment. Further techniques include new inhibitor chemistries that incorporate additional functional groups, new analytical techniques to improve the accuracy of the residual concentration of the inhibitor. Other techniques may include diversion techniques, such as using viscosifier fluids for heterogenous reservoirs and additives to enhance the inhibitor retention, often termed squeeze life enhancer (SLE).

Figure 3:
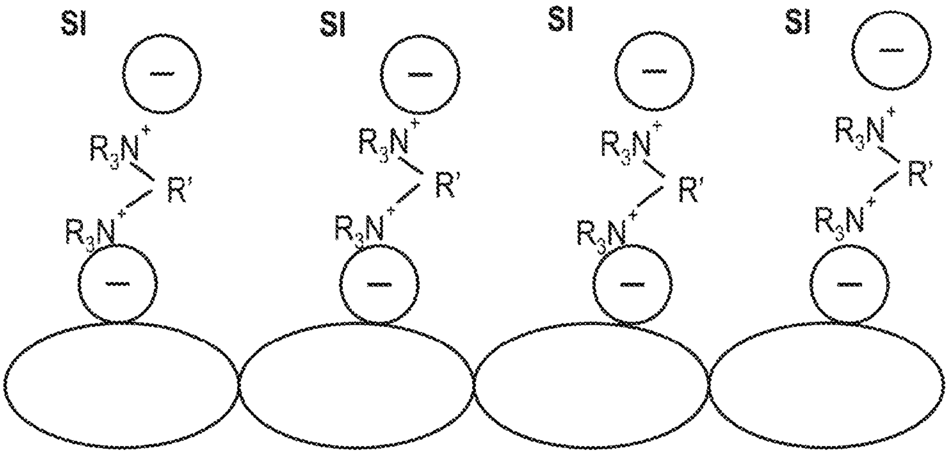
FIG. 3 is a drawing of a working mechanism of a squeeze life enhancer (SLE).
Figure 4:
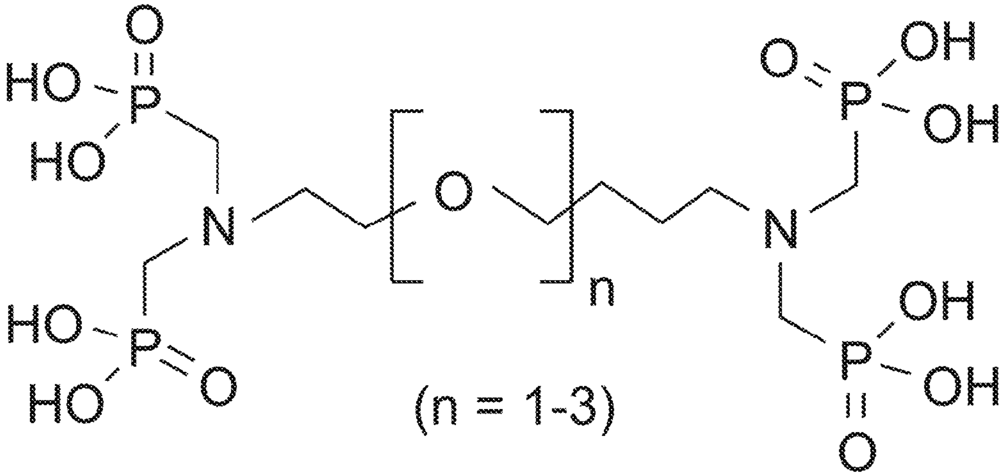
FIG. 4 is a molecular structure drawing of polyamino polyether methylene phosphonic acid (PAPEMP).

FIG. 3 is a drawing of a working mechanism of an SLE. This additive is used as a clay stabilizer in the oil and gas industry. The surfaces of most common clays found in oil-bearing formations, such as smectite, kaolinite, illite, and mixed layer versions of these, have many negatively charged sites. The negative charges are responsible for their sensitivity to aqueous fluids and provide the mechanism by which additives operate. The use of cationic organic compounds that can modify clay surface, for example, making the clay surface positively charged, allows better interaction with the negatively charged scale inhibitor, for example, as shown in FIG. 4. This can be used to improve squeeze lifetime.

FIG. 4 is a molecular structure drawing of polyamino polyether methylene phosphonic acid (PAPEMP). As described herein, when a small amount of PAPEMP is added to a scale inhibitor pill based on ATMP, experimental results showed potential for a significant increase in SIS treatment life.

Figure 5:
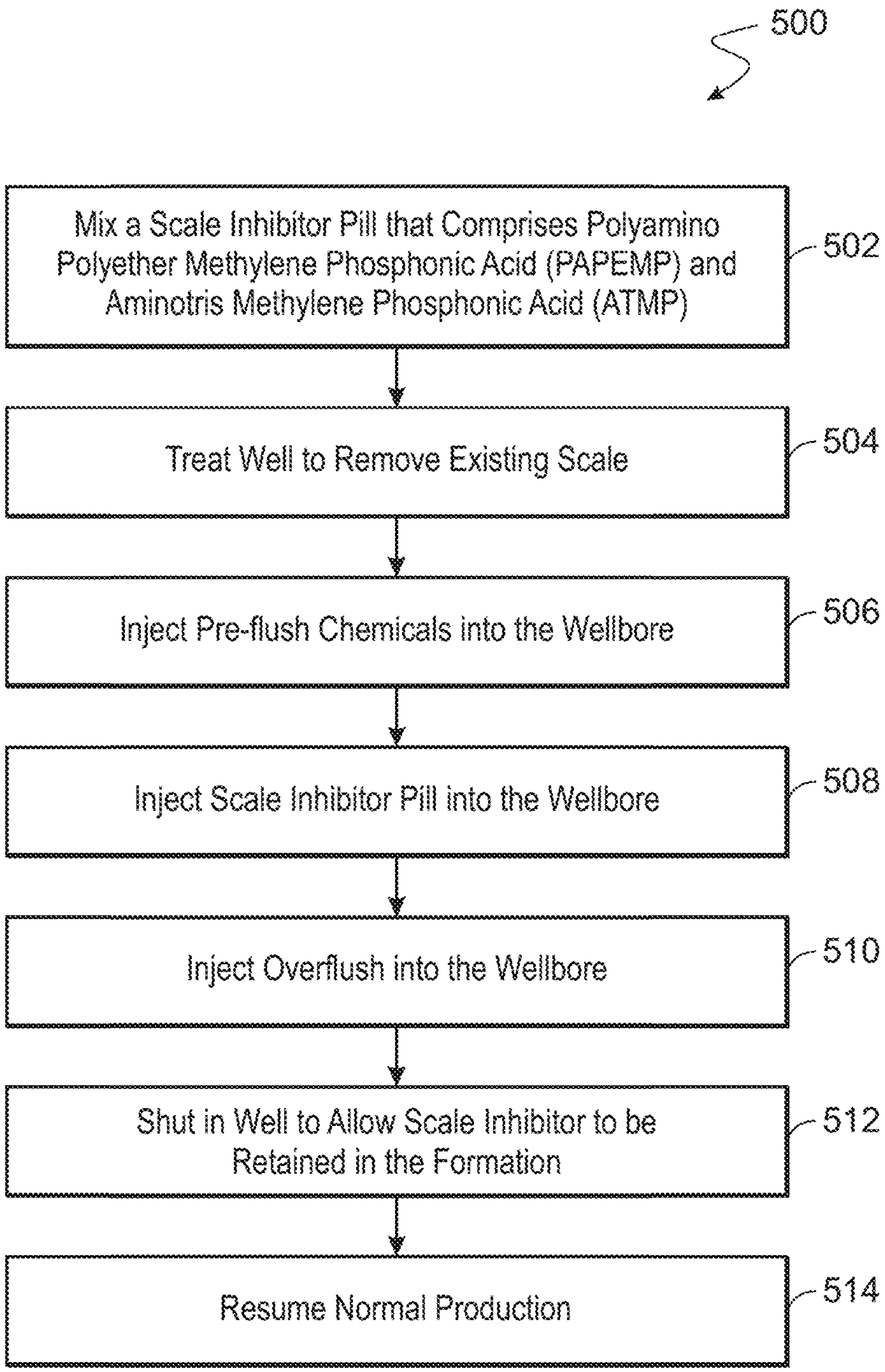
FIG. 5 is a block diagram of a method for treating a wellbore with a modified scale inhibitor pill to extend the SIS treatment life.

FIG. 5 is a block diagram of a method 500 for treating a wellbore with a modified scale inhibitor pill to extend the SIS treatment life. The method begins at block 502, with the mixing of a scale inhibitor pill that includes polyamino polyether methylene phosphonic acid (PAPEMP) and ATMP. In various embodiments, the scale inhibitor pill includes PAPEMP at a concentration of between about 0.5 wt. % and about 7 wt. %, or between about 1 wt. % and about 5 wt. %. In various embodiments, the scale inhibitor pill includes PAPEMP at a concentration of about 1 wt. %, about 2 wt. %, or about 5 wt. %. In various embodiments, the scale inhibitor pill includes ATMP at a concentration of between about 7 wt. % and about 20 wt. %, or between about 10 wt. % and about 14 wt. %. In various embodiments, the scale inhibitor pill includes ATMP at a concentration of about 10 wt. %, about 13 wt. %, or about 14 wt. %. In an embodiment, the scale inhibitor pill includes ATMP at a concentration of about 10 wt. % and PAPEMP at a concentration of about 5 wt. %. In an embodiment, the scale inhibitor pill includes ATMP at a concentration of about 13 wt. % and PAPEMP at a concentration of about 2 wt. % of the scale inhibitor composition. In an embodiment, the scale inhibitor pill includes ATMP at a concentration of about 14 wt. % and PAPEMP at a concentration of about 1 wt. % of the scale inhibitor composition.

At block 504, the wellbore is treated first to remove existing scale. This is performed with an acid treatment. For example, an acid treatment fluid is injected into the wellbore, and the spent treatment fluid is allowed to return to the surface. In some embodiments, the initial descaling is not performed.

At block 506, after the treatment fluid, such as spent acid and dissolved scale, is allowed to return, any pre-flush chemicals to be used are injected. These may include, for example, mutual solvents, clay stabilizers, surfactants, and the like.

At block 508, the scale inhibitor pill is then injected. As described herein, the scale inhibitor pill is a solution of ATMP and PAPEMP in field brine, for example, the concentrations mentioned above.

At block 510, an overflush is used to push the inhibitor several feet away from the wellbore, and into the reservoir. The overflush is usually field brine, although it may include other additives, such as clay stabilizers, additional scale inhibitors, biocides, and oxygen scavengers, among others.

At block 512, the wellbore is shut in for a target period of time, such as several hours to several days, to allow the scale inhibitor to be retained in the formation by adsorbing onto the rock surfaces or by precipitating in the formation. The target period of time may be between about 2 hours and about 72 hours, or between about 12 hours and about 48 hours, or between about 24 hours and about 36 hours. In some embodiments, the target period of time is about 6 hours, about 12 hours, about 24 hours, about 48 hours, or longer. The precipitation of the scale inhibitor usually occurs as a result of excess calcium.

At block 514, after the target period of time is completed, normal production is resumed. In some embodiments, the amount of scale inhibitor in the produced fluids is monitored during production.

EXAMPLES

Experiments using dynamic packed columns were conducted to investigate the inhibitor return behavior with and without PAPEMP additive. The columns were packed with sieved crushed limestone particles to simulate carbonate reservoirs. The size of the limestone particles were between about 0.5 mm and about 1 mm (about 18 mesh to about 40 mesh).

A lithium tracer was used to characterize the porosity and dispersivity of the packed columns prior to and after an inhibitor flood. Tracer floods were also incorporated within the inhibitor pill to allow direct comparison of the inhibitor and tracer profiles for inhibitor retardation.

Figure 6:
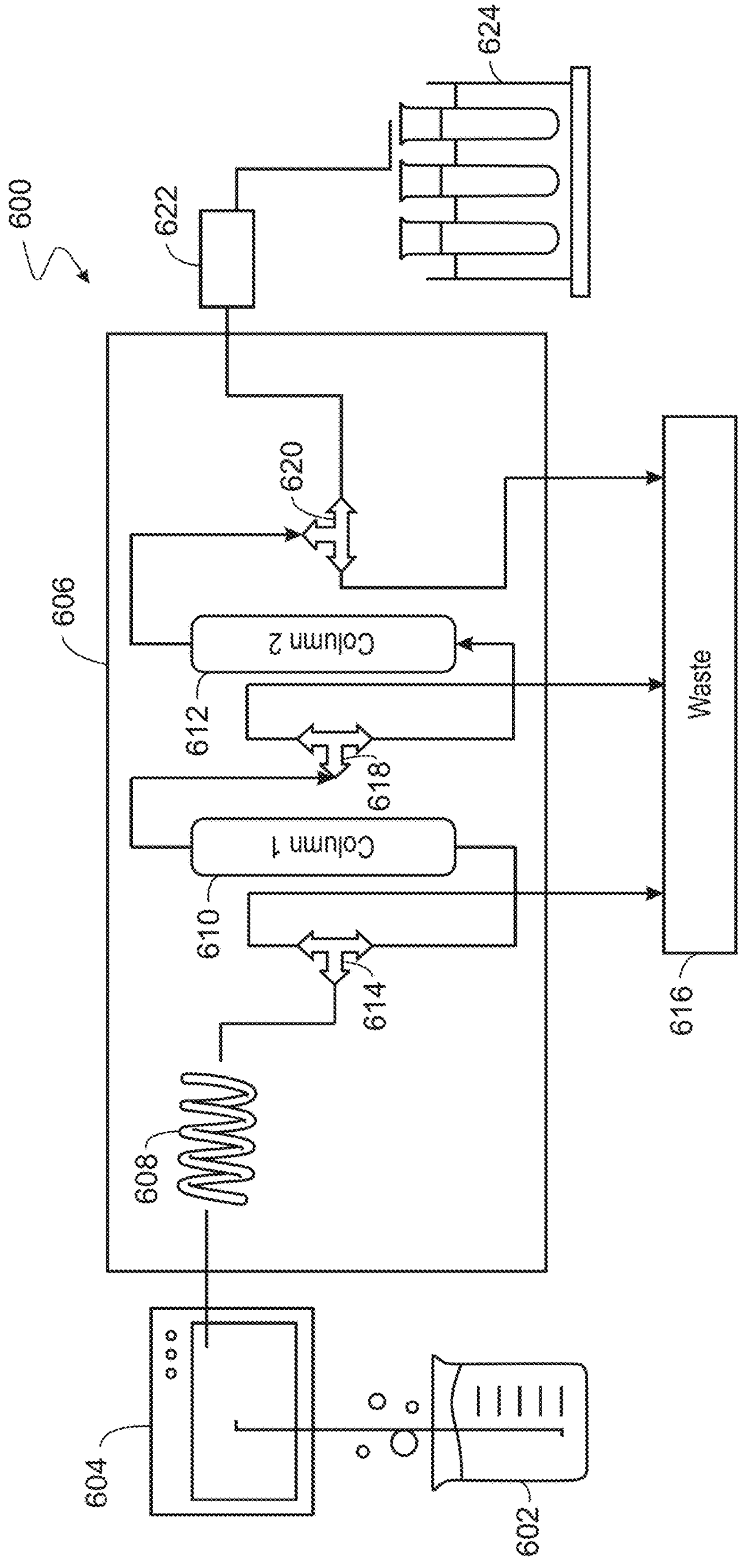
FIG. 6 is a drawing of an apparatus for testing flow through a dynamic packed column.

FIG. 6 is a drawing of an apparatus 600 for testing flow through a dynamic packed column. The apparatus 600 has a source solution 602, which may be an injection brine, inhibitor pill, or other solution during the testing. A pump 604 forces the source solution 602 through the apparatus 600. An oven 606 is used to maintain a constant temperature to simulate a reservoir, for example, of between about 50° C. and about 150° C., or between about 90° C. and about 100° C., or about 93° C., used for the tests herein. A heating coil 608 is used to raise the temperature of the source solution 602, for example, to match the temperature in the oven 606 prior to introducing it to the columns 610 and 612. The columns 610 and 612 are placed in series and can function as a single unit to increase the surface area. A three-way valve 614 upstream of the first column 610 can be used to divert the source solution 602 to a waste container 616, for example, to allow the heating coil 608 to reach temperature. A second three-way valve 618 placed between the first column 610 and the second column 612 can be used to allow flushing of the first column 610 to the waste container 616. A third three-way valve 620, downstream of the second column 612 can be used for flushing of both the first column 610 and the second column 612. A back pressure regulator 622 is used to hold pressure on the flow of the solutions through the apparatus 600, for example, to simulate the pressure of the reservoir. The solution flowing through the apparatus 600 is collected in tubes 624, for example, using an automated collection apparatus, or fraction collector, that switches between tubes 624 over a preset time frames, such as 5 min., 10 min, 60 min, 300 min, or longer.

Procedure

The dimensions of the columns 610 and 612 are 100 mm (L)×10 mm (D). As the columns 610 and 612 are connected in series, this provides a total column length of 100 mm. For testing, the flow rate set at the pump 604 was 2 mL/min for flowback, and 1 mL/min for column conditioning and inhibitor/additive injection The inhibitor pill included the scale inhibitor at 15% as active ingredient, for example, divided between the PAPEMP and the ATMP, using the proportions described herein. The inhibitor pill was prepared in a synthetic brine, as described below. Lithium at 500 ppm was also added to the inhibitor pill, and the pH was adjusted to the reported values using HCl or NaOH.

The synthetic brine was mixed to be descaling, by the omission of bicarbonate, following the recipe shown in Table 1. The pH was adjusted to 5.2. This was the solution used for column conditioning and flowback injection.

TABLE 1

Synthetic brine composition used for test

| Parameter | Concentration (mg/L) |
|---|---|
| Sodium | 23977 |
| Potassium | 891 |
| Magnesium | 1400 |
| Calcium | 7700 |
| Chloride | 54024 |
| Sulfate | 532 |

Testing Procedures

Figure 7:
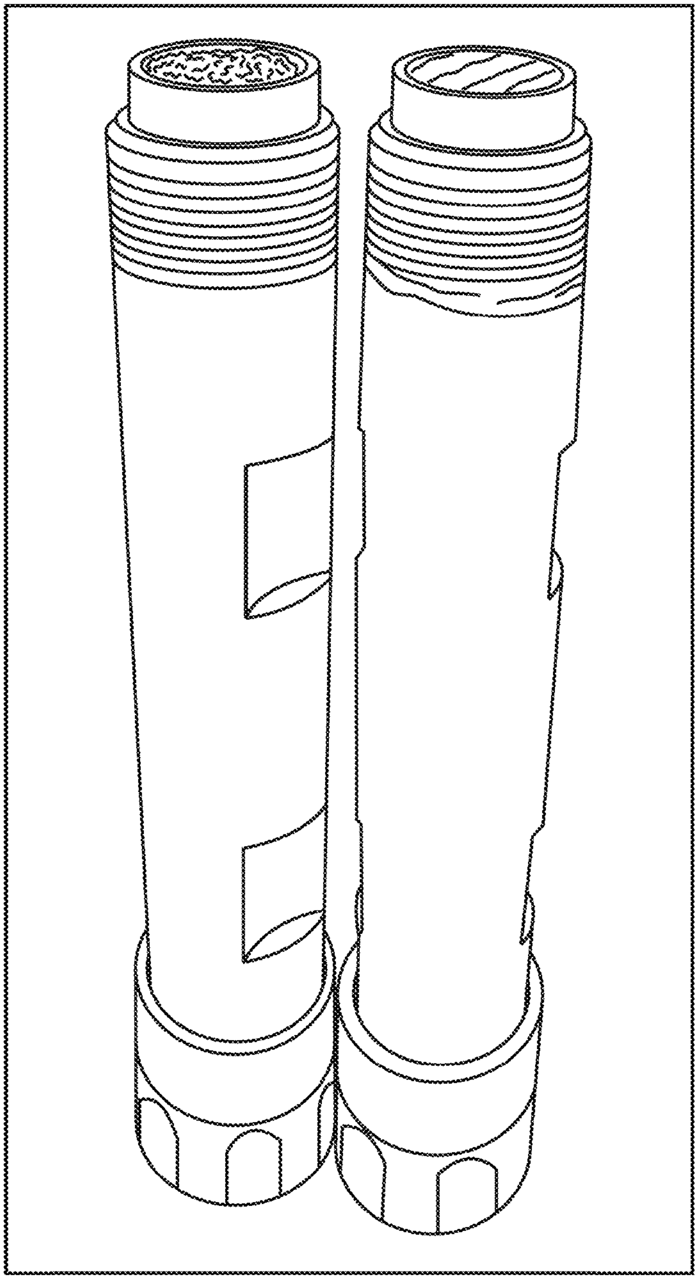
FIG. 7 is a drawing of two packed columns.

The columns 610 and 612 were packed with the sieved limestone particles, 11.3 grams in each column, as shown in FIG. 7. The columns 610 and 612 were assembled and mounted in the oven 606.

The columns 610 and 612 were conditioned using the synthetic brine at 1 mL/min. a leak check was performed at room temperature, then the temperature of the oven 606 was raised to 93° C. (199.4° F.). The column 610 and 612 were then conditioned at the elevated temperature for at least one hour.

After conditioning, three pore volumes (PV) of the inhibitor pill were injected at 1 mL/min to the column 610 and 612. PV is a term commonly used in the industry to refer to the "empty volume" that is the difference between the total volume of a core plug and the solid volume that is occupied by rock matrix. In this experiment, PV of two packed columns were determined as 3.0 mL. The columns 610 and 612 were then shut in for 24 hours. Flowback injection was then performed using the synthetic brine at 2 mL/min to the tubes 624 loaded on the fraction collector. The samples collected were analyzed for ATMP inhibitor concentration by an inductively coupled plasma (ICP) method. In the ICP method, known techniques are used to quantify the phosphorous content of the sample, which is then used to calculate the amount of the scale inhibitor in the sample.

Results

The core flooding experimental procedure included the injection of an inhibitor pill solution to the conditioned substrate during the adsorption stage, followed by desorption by injection with the synthetic produced water. By monitoring the core effluent, the nature of the interaction between the inhibitor and the core can be deduced. As described herein, all of the experiments used a high precision pump and a fraction collector to provide a stable flow and accurate sample volume collection.

Figure 8:
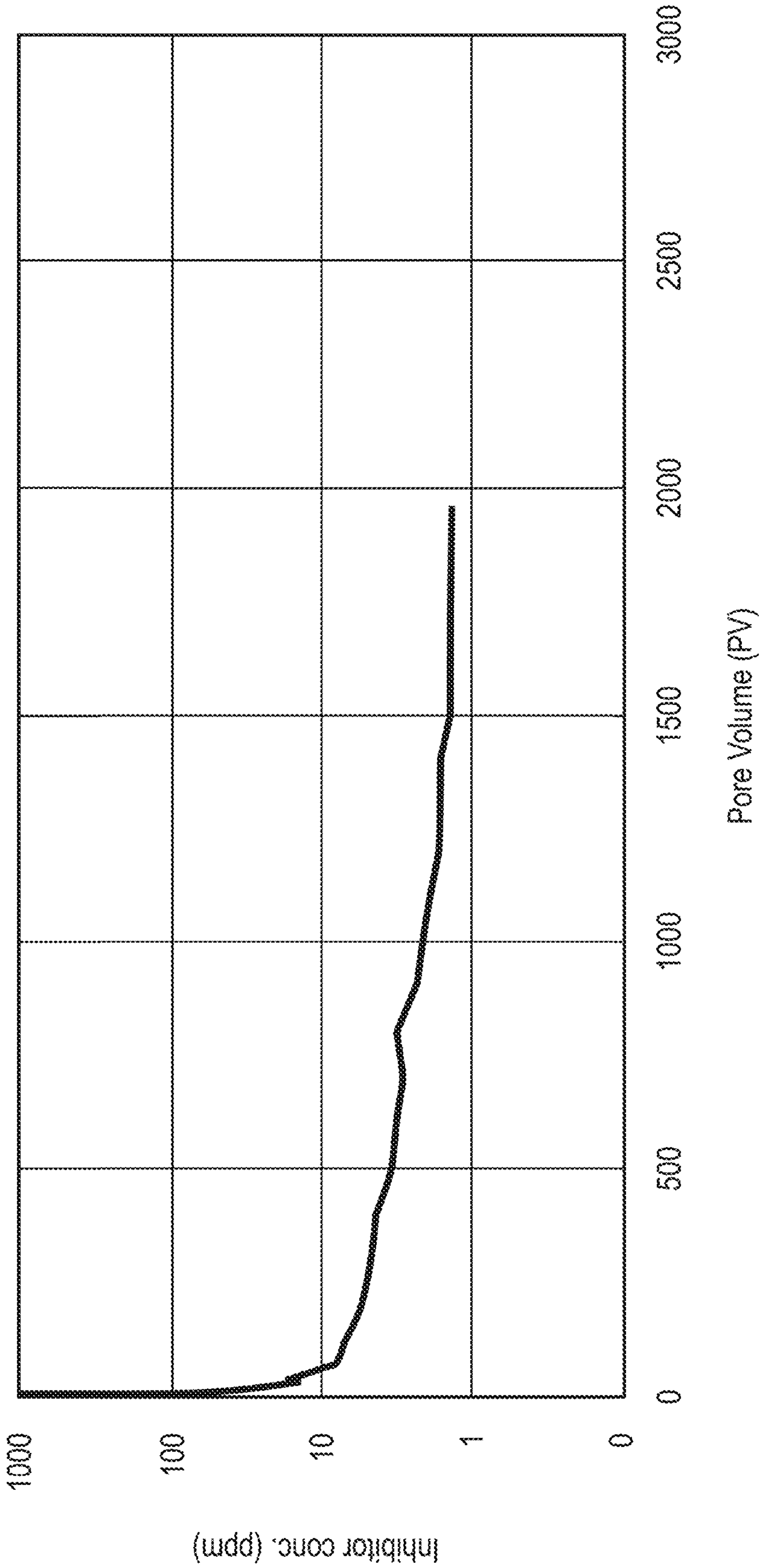
FIG. 8 is a plot of the inhibitor return results for an inhibitor pill containing a 15 wt. % solution of ATMP as the inhibitor pill.

FIG. 8 is a plot of the inhibitor return results for an inhibitor pill containing a 15 wt. % solution of ATMP as the inhibitor pill. The inhibitor concentration reached 3 ppm after 700 PV and 2 ppm after 1150 PV.

Figure 9:
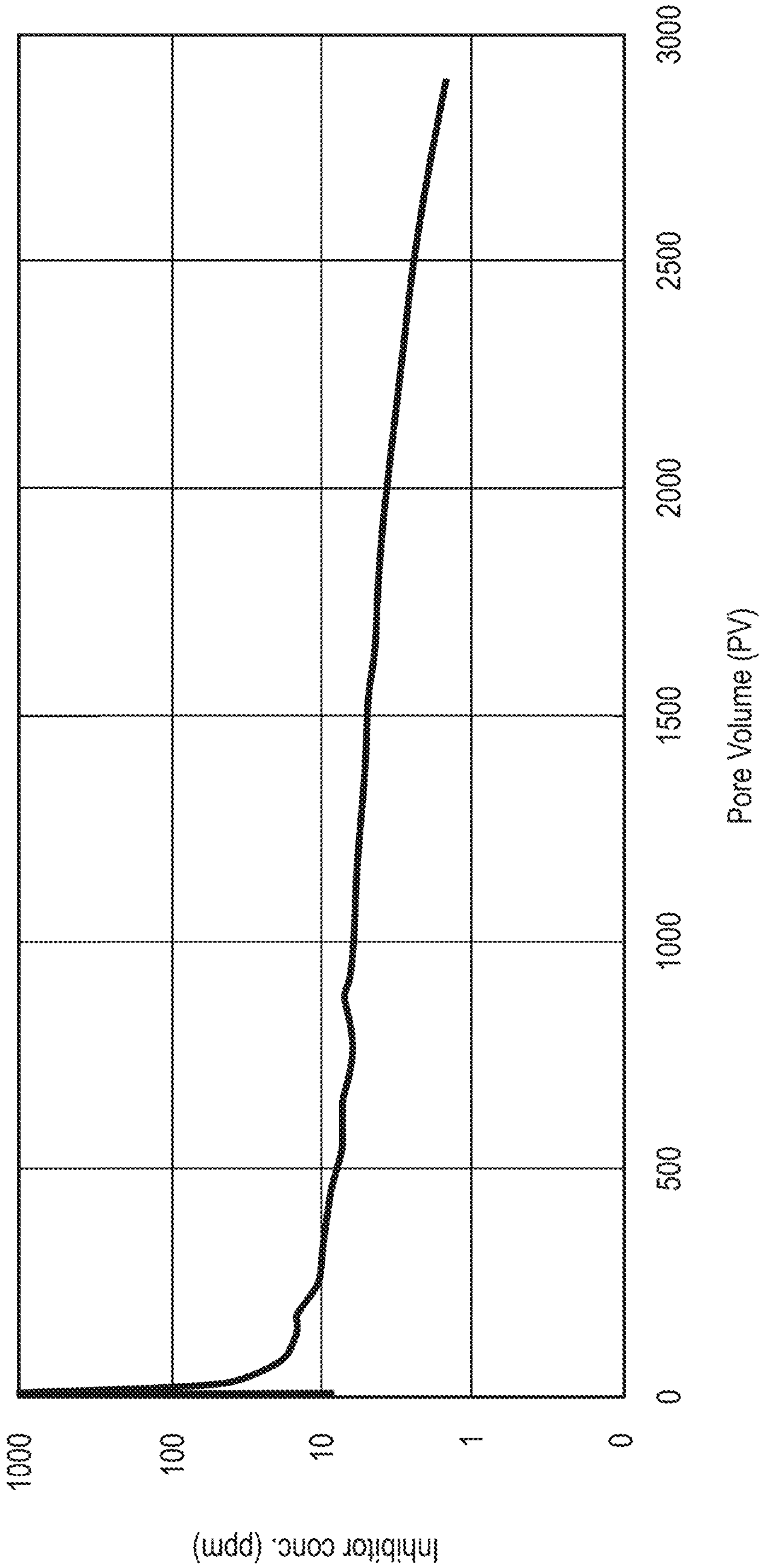
FIG. 9 is a plot of the inhibitor return results for an inhibitor pill containing 10 wt. % ATMP and 5 wt. % PAPEMP.

FIG. 9 is a plot of the inhibitor return results for an inhibitor pill containing 10 wt. % ATMP and 5 wt. % PAPEMP. The ATMP inhibitor concentration reached 3 ppm after 2250 PV and 2 ppm after 2680 PV.

Figure 10:
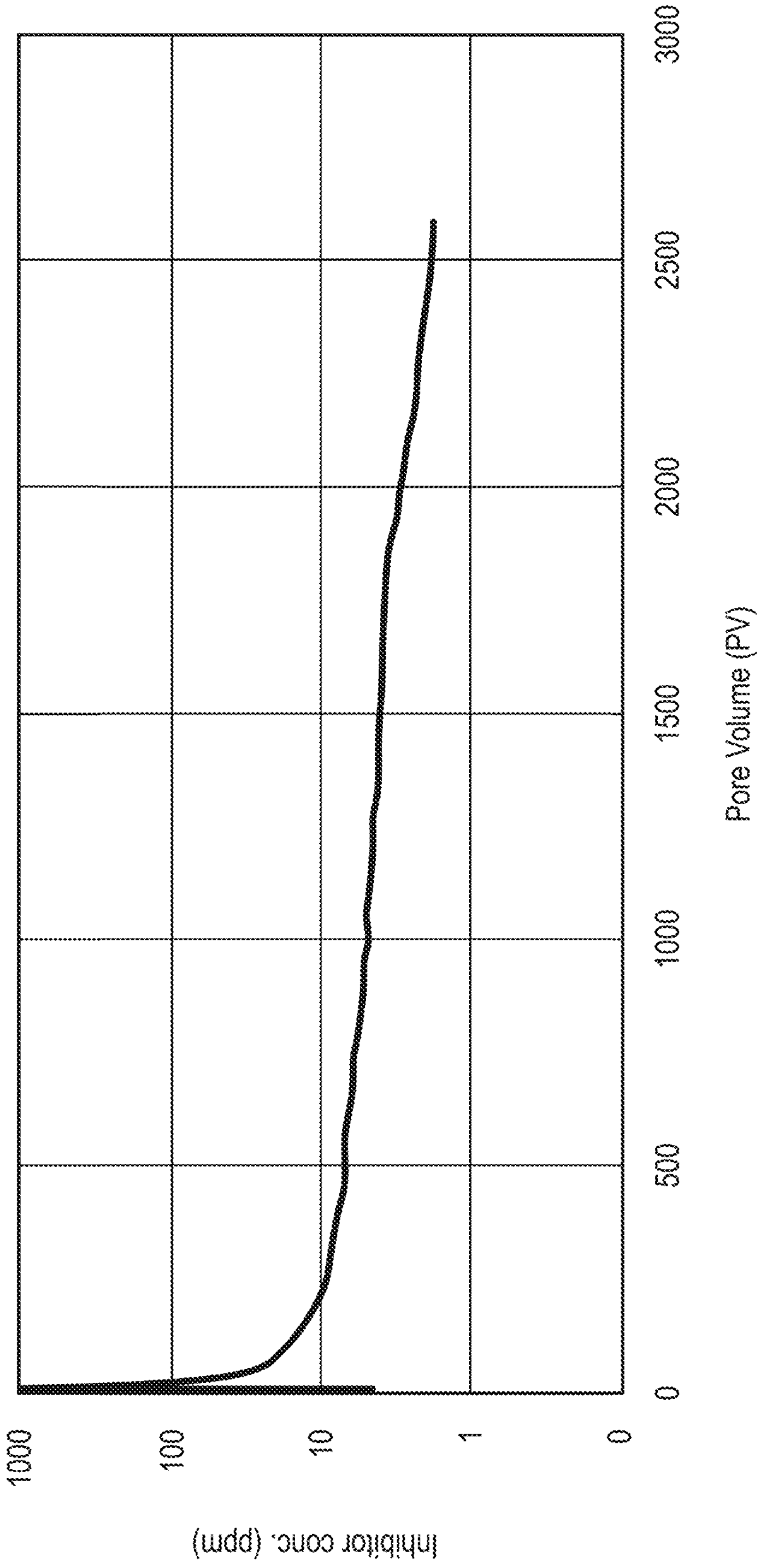
FIG. 10 is a plot of the inhibitor return results for an inhibitor pill containing 13 wt. % ATMP and 2 wt. % PAPEMP.

FIG. 10 is a plot of the inhibitor return results for an inhibitor pill containing 13 wt. % ATMP and 2 wt. % PAPEMP. The ATMP inhibitor concentration reached 3 ppm after 2000 PV and 2 ppm after 2390 PV.

Figure 11:
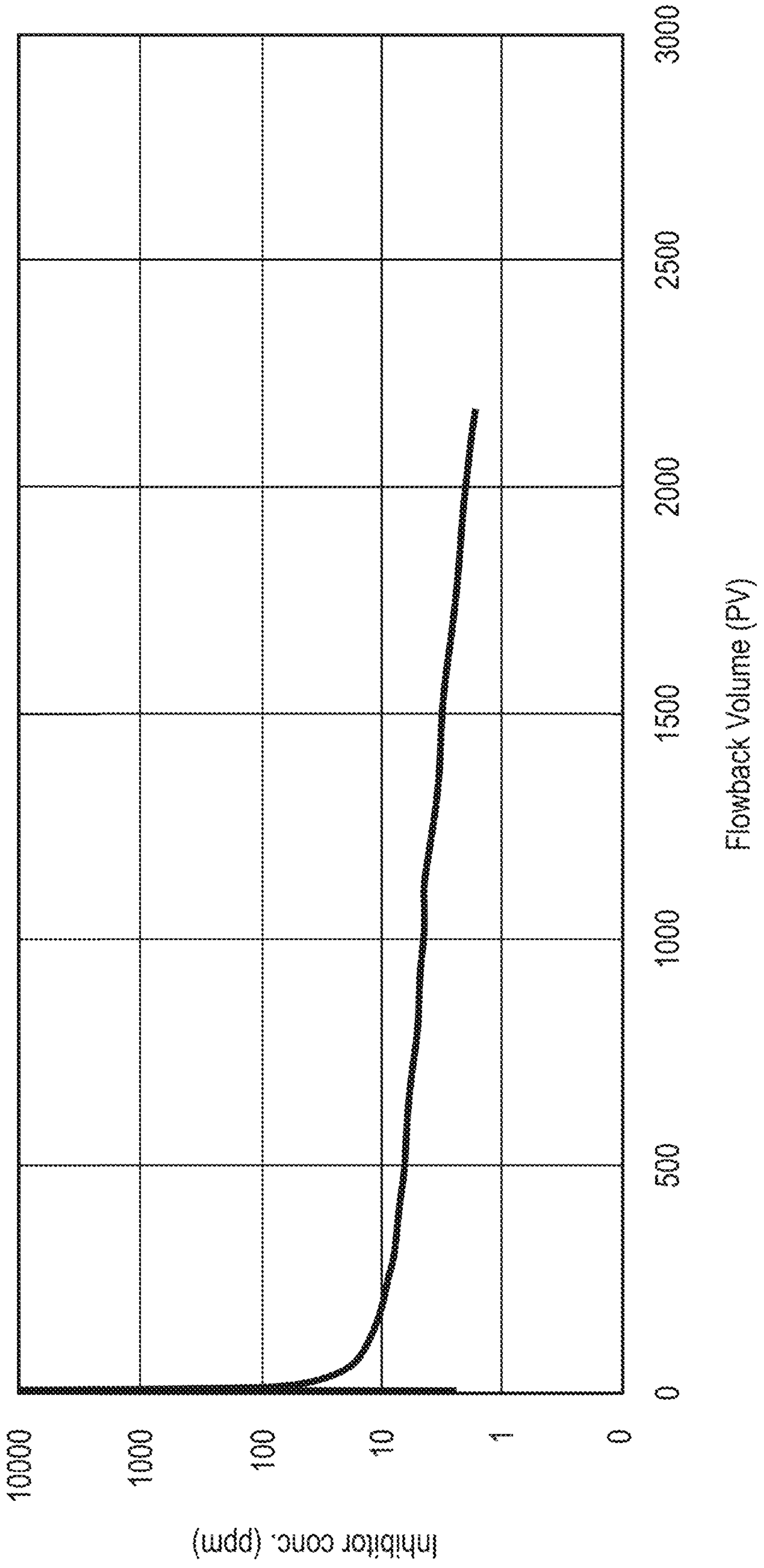
FIG. 11 is a plot of the inhibitor return results for an inhibitor pill containing 14 wt. % ATMP and 1 wt. % PAPEMP.

FIG. 11 is a plot of the inhibitor return results for an inhibitor pill containing 14 wt. % ATMP and 1 wt. % PAPEMP. The ATMP inhibitor concentration reached 3 ppm after 1550 PV and 2 ppm after 1970 PV.

Based on the results shown in FIGS. 8-11, the impact of the PAPEMP additive can be summarized as shown in Table 2. Further, it should be noted that, unlike other type of additives, PAPEMP itself is an effective scale inhibitor, as illustrated below.

TABLE 2

Summary of test results and estimated increase in SIS life

| Chemical Recipe | PV MEC = 3 ppm | Increase (%) MEC = 3 ppm | PV MEC = 2 ppm | Increase (%) MEC = 2 ppm |
|---|---|---|---|---|
| 15 wt. % ATMP/no PAPEMP | 700 | N/A | 1150 | N/A |
| 14 wt. % ATMP/1 wt. % PAPEMP | 1550 | 121 | 1970 | 71 |

TABLE 2-continued

| Summary of test results and estimated increase in SIS life | | | | |
|---|---|---|---|---|
| Chemical Recipe | PV MEC = 3 ppm | Increase (%) | PV MEC = 2 ppm | Increase (%) |
| 13 wt. % ATMP/2 wt. % PAPEMP | 2000 | 186 | 2390 | 108 |
| 10 wt. % ATMP/5 wt. % PAPEMP | 2250 | 221 | 2680 | 133 |

PAPEMP Efficacy as a Scale Inhibitor

Static bottle tests were conducted to demonstrate the efficacy of PAPEMP in inhibiting $CaCO_3$ scale formation as compared with ATMP. A simulated temperature for the wellhead was set to 77° C. (170.6° F.). Three $CaCO_3$ scaling brines were used to cover wide range of water chemistries and are shown in Table 3. These were a high-calcium brine, Brine #1, a medium-calcium brine, Brine #2, and a low-calcium brine, Brine #3.

TABLE 3

| Synthetic brine compositions for bottle tests | | | |
|---|---|---|---|
| Parameter | Brine #1 | Brine #2 | Brine # 3 |
| Sodium (mg/L) | 33655 | 23977 | 18414 |
| Potassium (mg/L) | 1183 | 891 | 775 |
| Magnesium (mg/L) | 1942 | 1400 | 987 |

TABLE 3-continued

| Synthetic brine compositions for bottle tests | | | |
|---|---|---|---|
| Parameter | Brine #1 | Brine #2 | Brine # 3 |
| Calcium (mg/L) | 12000 | 7700 | 3500 |
| Strontium (mg/L) | 606 | 290 | 123 |
| Bicarbonate (mg/L) | 360 | 462 | 679 |
| Chloride (mg/L) | 78230 | 54024 | 36114 |
| Sulfate (mg/L) | 578 | 532 | 1332 |
| pH | 7.1 | 7.4 | 7.6 |

Formation of scale precipitates were visually inspected, and the observation results were recorded after 2 and 24 hours of test durations. The test results are summarized in Tables 4-6, reporting the results as "Scale" and "No scale" based on the visual observations. The test results indicate that PAPEMP has similar $CaCO_3$ scale inhibition efficacy as the commonly used ATMP scale inhibitor.

As shown in Table 4, in Brine #1, scale precipitates were observed in the blank sample, but not in any of the inhibited samples after 2 hours. After 24 hours, precipitates were noted in the 2 ppm samples for both PAPEMP and ATMP, suggesting that PAPEMP is as effective as ATMP in preventing $CaCO_3$ scale formation.

TABLE 4

| Static bottle test results in high-Ca brine #1 | | | | | | |
|---|---|---|---|---|---|---|
| | Blank (0 ppm) | 2 ppm | 4 ppm | 6 ppm | 8 ppm | 10 ppm |
| After 2 hours | | | | | | |
| PAPEMP (30% active) | Scale | No scale | No scale | No scale | No scale | No scale |
| ATMP (30% active) | | No scale | No scale | No scale | No scale | No scale |
| After 24 hours | | | | | | |
| PAPEMP (30% active) | Scale | Scale | No scale | No scale | No scale | No scale |
| ATMP (30% active) | | Scale | No scale | No scale | No scale | No scale |

As shown in Table 5, in Brine #2, scale precipitates were observed in the blank and the 2 ppm samples after 2 hours. After 24 hours, precipitates were also noted in all of the 4 ppm samples, but not in the samples with higher inhibitor concentrations, e.g., ≥6 ppm, suggesting that PAPEMP is as effective as ATMP in preventing $CaCO_3$ scale formation.

TABLE 5

| Static bottle test results in medium-Ca brine #2 | | | | | | |
|---|---|---|---|---|---|---|
| | Blank (0 ppm) | 2 ppm | 4 ppm | 6 ppm | 8 ppm | 10 ppm |
| After 2 hours | | | | | | |
| PAPEMP (30% active) | Scale | Scale | No scale | No scale | No scale | No scale |
| ATMP (30% active) | | Scale | No scale | No scale | No scale | No scale |
| After 24 hours | | | | | | |
| PAPEMP (30% active) | Scale | Scale | Scale | No scale | No scale | No scale |
| ATMP (30% active) | | Scale | Scale | No scale | No scale | No scale |

As shown in Table 6, in Brine #3, after 2 hours, scale precipitates were observed in the blank, 2 ppm ATMP samples and in the 2 and 4 ppm PAPEMP samples. But after 24 hours, precipitates were noted in all samples with inhibitor concentrations less than 10 ppm, suggesting that PAPEMP has similar efficacy in inhibiting $CaCO_3$ scale precipitation.

TABLE 6

Static bottle test results in low-Ca brine #3

| | Blank (0 ppm) | 2 ppm | 4 ppm | 6 ppm | 8 ppm | 10 ppm |
|---|---|---|---|---|---|---|
| After 2 hours | | | | | | |
| PAPEMP (30% active) | Scale | Scale | Scale | No scale | No scale | No scale |
| ATMP (30% active) | | Scale | No scale | No scale | No scale | No scale |
| After 24 hours | | | | | | |
| PAPEMP (30% active) | Scale | Scale | Scale | Scale | Scale | No scale |
| ATMP (30% active) | | Scale | Scale | Scale | Scale | No scale |

Additional tests were also conducted with inhibitors with mixed ATMP and PAPEMP with the medium calcium brine #2. Results indicated the performance of ATMP inhibitor was not adversely affected by PAPEMP, with the results shown in Table 7.

TABLE 7

Static bottle test results in Brine #2 for mixed inhibitors

| | Blank (0 ppm) | 2 ppm | 4 ppm | 6 ppm | 8 ppm | 10 ppm |
|---|---|---|---|---|---|---|
| After 2 hours | | | | | | |
| ATMP (22.5% active)/ PAPEMP (7.5% active) | Scale | Scale | No scale | No scale | No scale | No scale |
| ATMP (15% active)/ PAPEMP (15% active) | | Scale | No scale | No scale | No scale | No scale |
| ATMP (7.5% active)/ PAPEMP (12.5% active) | | Scale | No scale | No scale | No scale | No scale |
| After 24 hours | | | | | | |
| ATMP (22.5% active)/ PAPEMP (7.5% active) | Scale | Scale | Scale | No scale | No scale | No scale |
| ATMP (15% active)/ PAPEMP (15% active) | | Scale | Scale | No scale | No scale | No scale |
| ATMP (7.5% active)/ PAPEMP (22.5% active) | | Scale | Scale | No scale | No scale | No scale |

EMBODIMENTS

Another embodiment disclosed here provides a method for implementing a squeeze treatment to apply a scale inhibitor in a wellbore. The method includes mixing a scale inhibitor pill. The scale inhibitor pill includes PAPEMP and ATMP. Pre-flush chemicals are injected into the wellbore. The scale inhibitor pill is injected into the wellbore. An over flush is injected into the wellbore. The wellbore is shut in for a target period of time and normal production is resumed.

In an aspect, combinable with any other aspect, the scale inhibitor composition includes artificial brine base fluid.

In an aspect, combinable with any other aspect, the PAPEMP includes about 0.5 wt. % to about 7 wt. % of the scale inhibitor composition.

In an aspect, combinable with any other aspect, the PAPEMP includes about 1 wt. % to about 5 wt. % of the scale inhibitor composition.

In an aspect, combinable with any other aspect, the PAPEMP includes about 2 wt. % of the scale inhibitor composition.

In an aspect, combinable with any other aspect, the ATMP includes about 7 wt. % to about 20 wt. % of the scale inhibitor composition.

In an aspect, combinable with any other aspect, wherein the ATMP includes about 10 wt. % to about 14 wt. % of the scale inhibitor composition.

In an aspect, combinable with any other aspect, the ATMP includes about 10 wt. % of the scale inhibitor composition and PAPEMP includes about 5 wt. % of the scale inhibitor composition.

In an aspect, combinable with any other aspect, the ATMP includes about 13 wt. % of the scale inhibitor composition and PAPEMP includes about 2 wt. % of the scale inhibitor composition.

In an aspect, combinable with any other aspect, the ATMP includes about 14 wt. % of the scale inhibitor composition and PAPEMP includes about 1 wt. % of the scale inhibitor composition.

In an aspect, combinable with any other aspect, the scale inhibitor composition includes a clay stabilizer, a mutual solvent, or both.

Another embodiment disclosed here provides a method for implementing a squeeze treatment to apply a scale inhibitor in a wellbore. The method includes mixing a scale inhibitor pill. The scale inhibitor pill includes polyamino polyester methylene phosphonic acid (PAPEMP) and amino tris-methylene phosphonic acid (ATMP). Pre-flush chemicals are injected into the wellbore. The scale inhibitor pill is injected into the wellbore. An over flush is injected into the wellbore. The wellbore is shut in for a target period of time and normal production is resumed.

Another embodiment disclosed here provides a method for implementing a squeeze treatment to apply a scale inhibitor in a wellbore. The method includes mixing a scale inhibitor pill. The scale inhibitor pill includes polyamino polyether methylene phosphonic acid (PAPEMP) and amino trimethylene phosphonic acid (ATMP). Pre-flush chemicals are injected into the wellbore. The scale inhibitor pill is injected into the wellbore. An over flush is injected into the wellbore. The wellbore is shut in for a target period of time and normal production is resumed. In an aspect, combinable with any other aspect, the method includes treating the wellbore to remove existing scale. In an aspect, treating the wellbore includes injecting an acid treatment fluid into the wellbore. In an aspect, the method includes allowing the treatment fluid to return to a surface after the treatment.

In an aspect, combinable with any other aspect, injecting the pre-flush chemicals into the wellbore includes injecting a solution of mutual solvents, or clay stabilizers, or both into the wellbore.

In an aspect, combinable with any other aspect, injecting the overflush into the wellbore includes pushing the scale inhibitor pill into a reservoir from the wellbore.

In an aspect, combinable with any other aspect, shutting the wellbore and for the target period of time includes preventing flow in or out of the wellbore for between about 2 hours and about 5 days.

In an aspect, combinable with any other aspect, resuming normal production includes opening the wellbore to allow produced fluids to flow from the wellbore and monitoring the produced fluids to determine a concentration of a scale inhibitor compounds.

Other implementations are also within the scope of the following claims.

What is claimed is:

1. A method for implementing a squeeze treatment to apply a scale inhibitor in a wellbore, comprising:

based on a calcium carbonate scale tendency of a reservoir fluid of a reservoir into which the wellbore has been drilled, determining a target concentration of polyamino polyether methylene phosphonic acid (PAPEMP) in a scale inhibitor pill comprising at least 7% amino trimethylene phosphonic acid (ATMP), wherein the target concentration of PAPEMP is less than the concentration of ATMP and is selected to increase retention of the ATMP in the reservoir;

mixing the scale inhibitor pill with the least 7% ATMP and the target concentration of PAPEMP;

injecting pre-flush chemicals into the wellbore;

injecting the scale inhibitor pill into the wellbore;

injecting an over flush into the wellbore;

shutting in the wellbore for a target period of time;

opening the wellbore to allow produced fluids to flow from the wellbore;

determining a concentration of ATMP in the produced fluids; and repeating the injection in response to the concentration of ATMP in the produced fluids.

2. The method of claim 1, further comprising treating the wellbore to remove existing scale prior to the injecting of the scale inhibitor pill.

3. The method of claim 2, wherein treating the wellbore comprises injecting an acid treatment fluid into the wellbore.

4. The method of claim 3, comprising allowing the acid treatment fluid to return to a surface after the treatment.

5. The method of claim 1, wherein mixing the scale inhibitor pill comprises forming a solution of PAPEMP and ATMP in a brine base fluid.

6. The method of claim 1, wherein mixing the scale inhibitor pill comprises forming a solution of about 10 wt. % ATMP and about 5 wt. % PAPEMP.

7. The method of claim 1, wherein mixing the scale inhibitor pill comprises forming a solution of about 13 wt. % ATMP and about 2 wt. % PAPEMP.

8. The method of claim 1, wherein mixing the scale inhibitor pill comprises forming a solution of about 14 wt. % ATMP and about 1 wt. % PAPEMP.

9. The method of claim 1, wherein injecting the pre-flush chemicals into the wellbore comprises injecting a solution of mutual solvents, or clay stabilizers, or both into the wellbore.

10. The method of claim 1, wherein injecting the overflush into the wellbore comprises pushing the scale inhibitor pill into a reservoir from the wellbore.

11. The method of claim 1, wherein shutting the wellbore for the target period of time comprises preventing flow in or out of the wellbore for between about 2 hours and about 5 days.

* * * * *